(12) United States Patent
Jo et al.

(10) Patent No.: US 10,374,250 B2
(45) Date of Patent: Aug. 6, 2019

(54) STACK-FOLDING TYPE ELECTRODE ASSEMBLY

(71) Applicant: LG Chem, Ltd., Seoul (KR)

(72) Inventors: Vin-Na Jo, Daejeon (KR); Jae-Hyun Lee, Daejeon (KR); Ji-Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 298 days.

(21) Appl. No.: 15/326,222

(22) PCT Filed: Feb. 15, 2016

(86) PCT No.: PCT/KR2016/001341
§ 371 (c)(1),
(2) Date: Jan. 13, 2017

(87) PCT Pub. No.: WO2016/137142
PCT Pub. Date: Sep. 1, 2016

(65) Prior Publication Data
US 2017/0207480 A1    Jul. 20, 2017

(30) Foreign Application Priority Data

Feb. 27, 2015  (KR) .................. 10-2015-0028407

(51) Int. Cl.
*H01M 10/04* (2006.01)
*H01M 10/0583* (2010.01)
*H01M 2/16* (2006.01)
*H01M 10/0525* (2010.01)

(52) U.S. Cl.
CPC ....... *H01M 10/0459* (2013.01); *H01M 2/166* (2013.01); *H01M 2/1653* (2013.01);
(Continued)

(58) Field of Classification Search
CPC ......... H01M 10/0459; H01M 10/0413; H01M 2/166; H01M 2/1653; H01M 10/0525; H01M 10/0583
See application file for complete search history.

(56) References Cited

U.S. PATENT DOCUMENTS 9,502,734 B1 * 11/2016 Lim ................. H01M 10/0436
2002/0160257 A1 * 10/2002 Lee ......................... H01M 6/46
429/130
(Continued)

FOREIGN PATENT DOCUMENTS

CN    103325975 A    9/2013
CN    103636046 A    3/2014
(Continued)

OTHER PUBLICATIONS

Extended European Search Report of EP 16755792 dated Nov. 21, 2017.
(Continued)

*Primary Examiner* — Michael L Dignan
(74) *Attorney, Agent, or Firm* — Lerner, David, Littenberg, Krumholz & Mentlik, LLP

(57) ABSTRACT

The present disclosure provides a stack-folding typed electrode assembly including an electrode assembly having a structure in which a plurality of unit cells overlaps and a continuous folding separator is interposed between each overlapping part, wherein the continuous folding separator comprises a continuous porous polymer substrate having pores; and an organic-inorganic porous coating layer formed of a mixture of inorganic particles and a binder polymer, wherein the organic-inorganic porous coating layer is discontinuously provided at the overlapping part, to allow easy impregnation of an electrolyte solution, and reduce the volume compared to a traditional electrode assembly.

11 Claims, 11 Drawing Sheets

(52) U.S. Cl.
CPC ... *H01M 10/0413* (2013.01); *H01M 10/0525* (2013.01); *H01M 10/0583* (2013.01)

(56) References Cited

U.S. PATENT DOCUMENTS

| | | | |
|---|---|---|---|
| 2002/0160258 A1 | 10/2002 | Lee et al. | |
| 2003/0013012 A1 | 1/2003 | Ahn et al. | |
| 2010/0261047 A1* | 10/2010 | Kim | H01M 2/0275 429/144 |
| 2013/0011715 A1 | 1/2013 | Lee et al. | |
| 2013/0084483 A1* | 4/2013 | Lee | H01M 2/166 429/143 |
| 2013/0252066 A1 | 9/2013 | Yeou et al. | |
| 2013/0280583 A1 | 10/2013 | Lee et al. | |

FOREIGN PATENT DOCUMENTS

| | | |
|---|---|---|
| EP | 2750234 A1 | 7/2014 |
| EP | 2808933 A1 | 12/2014 |
| JP | 2006049114 A | 2/2006 |
| KR | 20010082058 A | 8/2001 |
| KR | 20010082059 A | 8/2001 |
| KR | 20010082060 A | 8/2001 |
| KR | 20110058657 A | 6/2011 |
| KR | 20120114142 A | 10/2012 |
| KR | 20130052526 A | 5/2013 |
| KR | 20130099463 A | 9/2013 |
| KR | 20140000911 A | 1/2014 |
| KR | 20140070240 A | 6/2014 |
| KR | 20140070936 A | 6/2014 |
| WO | 01/59868 A1 | 8/2001 |
| WO | 2008130175 A1 | 10/2008 |

OTHER PUBLICATIONS

International Search Report from PCT/KR2016/001341, dated May 25, 2016.

* cited by examiner

STACK-FOLDING TYPE ELECTRODE ASSEMBLY

CROSS-REFERENCE TO RELATED APPLICATIONS

The present application is a national phase entry under 35 U.S.C. § 371 of International Application No. PCT/KR2016/001341 filed on Feb. 5, 2016, which claims priority to Korean Patent Application No. 10-2015-0028407 filed in the Republic of Korea on Feb. 27, 2015, the disclosures of which are incorporated herein by reference.

FIELD OF INVENTION

The present disclosure relates to a stack-folding typed electrode assembly. More particularly, the present disclosure relates to a stack-folding typed electrode assembly for preventing an unnecessary volume increase of an electrochemical device and allowing for easy impregnation of an electrolyte solution.

BACKGROUND

Recently, there has been growing interest in energy storage technologies. As the application fields of energy storage technologies have been extended to mobile phones, camcorders, lap-top computers and even electric cars, efforts have been increasingly made towards the research and development of batteries. In this aspect, electrochemical devices have attracted the most attention, and particularly, with the recent movement towards minimization and light weight of electronic devices, the development of secondary batteries having a small size and light weight and capable of charging and discharging with high capacity is the focus of particular interest.

A secondary battery is classified, based on a structure of an electrode assembly composed of a positive electrode/a separator/a negative electrode, typically into a jelly-roll (wound) electrode assembly having a structure in which long sheet-type positive and negative electrodes are wound with separators interposed between, and a stack-type electrode assembly having a structure in which a plurality of positive and negative electrodes cut to a predetermined size are stacked in a sequential order with separators interposed between.

However, these traditional electrode assemblies have several problems.

First, a jelly-roll electrode assembly is made by winding long sheet-type positive and negative electrodes with a high density into a cylindrical or oval structure in cross section, and during charge and discharge, stresses caused by expansion and contraction of the electrode accumulate in the electrode assembly, and when the accumulated stresses exceed a predetermined limit, deformation of the electrode assembly occurs. The deformation of the electrode assembly results in non-uniform interval between the electrodes, so the battery performance drastically degrades, and if an internal short circuit occurs, the battery safety may be threatened. Also, when winding long sheet-type positive and negative electrodes, it is difficult to wind the positive and negative electrodes at a high speed with regular intervals therebetween, resulting in reduced productivity.

Second, a stack-type electrode assembly is made by stacking a plurality of positive and negative electrode units in a sequential order, and thus, a delivery process of a polar plate for manufacturing the unit is separately needed and a sequential stacking process takes a lot of time and efforts, resulting in low productivity.

To solve the problems, attempts have been made to develop an electrode assembly of an advanced structure in which a jellyroll type and a stack type are combined, called a stack-folding type electrode assembly having a structure in which bicells or full cells including a predetermined unit of positive and negative electrodes stacked with separators interposed between are folded using a long continuous separator sheet, and examples are disclosed in the Applicant's Patent Application Publication Nos. 2001-0082058A, 2001-0082059, and 2001-0082060.

FIGS. 1 through 3 are cross-sectional views in outline illustrating the structure of a stack-folding type electrode assembly. In the drawings, like reference numerals designate like elements.

Referring to FIGS. 1 through 3, electrode assemblies include a plurality of unit cells $7a$, $7b$, and $7c_1$ and $7c_2$, each unit cell including separators $3a$, $3b$, and $3c$, and negative electrodes $1a$, $1b$, and $1c$ and positive electrodes $5a$, $5b$, and $5c$ disposed at both sides of the separators $3a$, $3b$, and $3c$, respectively. The positive electrodes $5a$, $5b$, and $5c$ have a structure in which a positive electrode active material layer is formed on both surfaces of a positive electrode current collector, and the negative electrodes $1a$, $1b$, and $1c$ have a structure in which a negative electrode active material layer is formed on both surfaces of a negative electrode current collector. As shown in FIGS. 1 through 3, the unit cell may be formed in various structures including a structure of full cells $7a$ and $7b$ in which the positive electrode $5a$ and $5b$ and the negative electrode $1a$ and $1b$ are disposed one by one at both sides of the separator $3a$ and $3b$, and a structure of bicells $7c_1$ and $7c_2$ in which each separator $3c$ is disposed on both surfaces of the positive electrode $5c$ or the negative electrode $1c$ and the negative electrode $1c$ or the positive electrode $5c$ is each disposed on each separator $3c$ (a structure of positive electrode/separator/negative electrode/separator/positive electrode or a structure of negative electrode/separator/positive electrode/separator/negative electrode).

Inside the electrode assemblies 10, 20, and 30, each of the unit cells $7a$, $7b$, $7c_1$, and $7c_2$ exists in a stacked shape. In this instance, continuous single folding separators $9a$, $9b$, and $9c$ are arranged in various shapes as shown in FIGS. 1 through 3 between the adjacent unit cells $7a$, $7b$, and $7c_1$ and $7c_2$ corresponding to each other, surrounding the unit cells $7a$, $7b$, and $7c_1$ and $7c_2$, respectively, and perform a separator function between the unit cells $7a$, $7b$, and $7c_1$ and $7c_2$, respectively.

The manufactured stack-folding type electrode assembly is received in a battery case, followed by injection of an electrolyte solution, to fabricate a battery. However, after injecting the electrolyte solution, the time for the electrolyte solution to permeate the separator sufficiently is needed. Due to the productivity problem, however, a sufficient impregnation time is not given in real situation, disallowing the electrolyte solution to permeate the separator, resulting in low wettability, and the electrolyte solution that did not permeate the separator may leak in severe conditions. Therefore, there is a need for approaches to allow easy impregnation of the electrolyte solution in the stack-folding electrode assembly.

In addition, because the stack-folding electrode assembly surrounds the unit cells with the folding separator, the electrode assembly inevitably increases in thickness according to the structure due to the folding separator. In keeping up with the recent trend towards volume minimization of secondary batteries, there is the demand for approaches to reduce the volume of the electrode assembly.

DISCLOSURE

Technical Problem

Accordingly, the present disclosure is directed to providing a stack-folding typed electrode assembly for improving wettability of a battery and reducing the volume of the electrode assembly.

Technical Solution

To achieve the object, the present disclosure provides a stack-folding typed electrode assembly including an electrode assembly having a structure in which a plurality of unit cells overlaps and a continuous folding separator is interposed between each overlapping part, wherein the continuous folding separator comprises a continuous porous polymer substrate having pores; and an organic-inorganic porous coating layer formed of a mixture of inorganic particles and a binder polymer, wherein the organic-inorganic porous coating layer is discontinuously provided at the overlapping part.

According to a preferred embodiment of the present disclosure, the organic-inorganic porous coating layer may have a width of a same size as the unit cell. Alternatively, the organic-inorganic porous coating layer may have a larger width than the unit cell by 0.2 to 10 mm, more preferably by 1.5 to 7.5 mm for a positive electrode, and a larger width by 0.1 to 9 mm, more preferably by 1 to 6 mm for a negative electrode.

According to another preferred embodiment of the present disclosure, the porous substrate may be formed of at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide and polyethylenenaphthalene.

According to another preferred embodiment of the present disclosure, the inorganic particles may be selected from the group consisting of an inorganic particle having a dielectric constant of higher than or equal to 5, an inorganic particle having a lithium ion transfer capability, and mixtures thereof.

According to another preferred embodiment of the present disclosure, the continuous porous substrate of the folding separator may have a thickness of from 1 to 100 μm.

According to another preferred embodiment of the present disclosure, the discontinuous organic-inorganic porous coating layer of the folding separator may have a thickness of from 0.01 to 20 μm.

According to another preferred embodiment of the present disclosure, the folding separator may have a unit length sufficient to surround the unit cells, and may be folded each unit length and continuously surround the unit cells, starting from a center unit cell to an outermost unit cell.

According to another aspect of the present disclosure, there is provided an electrochemical device including the stack-folding typed electrode assembly according to the present disclosure received in a case.

According to a preferred embodiment of the present disclosure, the electrochemical device may be a lithium secondary battery.

Advantageous Effects

The stack-folding typed electrode assembly according to an embodiment of the present disclosure has the folding separator with the organic-inorganic porous coating layer formed only at areas where unit cells overlap, while only the porous substrate is present at an area where unit cells do not overlap, namely, a thickness-wise direction part, allowing easier impregnation following electrolyte solution injection.

In addition, the stack-folding electrode assembly according to an embodiment of the present disclosure has the folding separator with the organic-inorganic porous coating layer formed only at the area where the unit cells overlap, the volume of the electrode assembly may reduce by as much as the thickness of the organic-inorganic porous coating layer. For example, the volume in the thickness-wise direction of the electrode assembly may reduce by (thickness of the organic-inorganic coating layer of the folding separator)* (number of unit cells+1).

BRIEF DESCRIPTION OF THE DRAWINGS

The accompanying drawings illustrate preferred embodiments of the present disclosure and, together with the foregoing disclosure, serve to provide further understanding of the technical spirit of the present disclosure, and the present disclosure is not to be construed as being limited to the drawings.

BEST MODE

Figure 1:
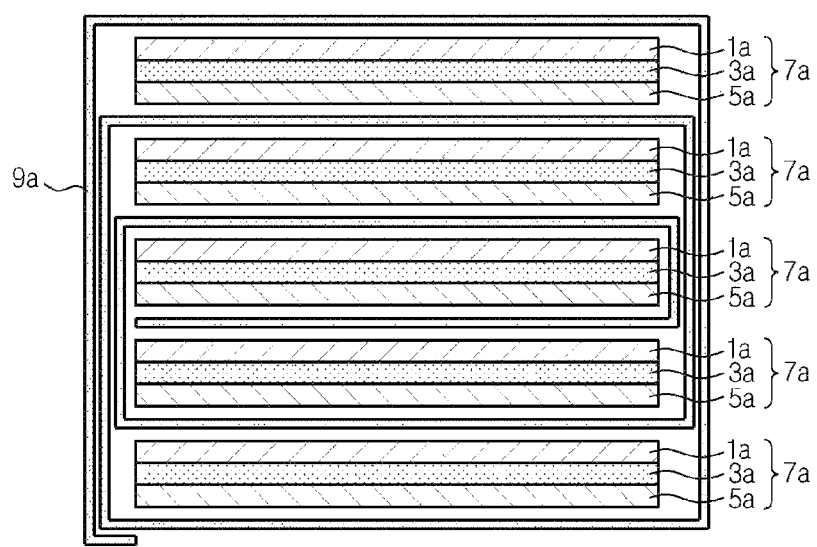
FIG. 1 is a cross-sectional view in outline showing an example of implementation of a stack-folding typed electrode assembly.

Hereinafter, the present disclosure will be described in further detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the configurations illustrated in the drawings and the embodiments are just preferable examples for the purpose of illustrations only, not intended to limit the scope of the disclosure, so it should be understood that a variety of other equivalents and modifications which can substitute them could be made at the time the application is filed.

The present disclosure provides a stack-folding typed electrode assembly having a structure in which a plurality of unit cells overlaps and a continuous folding separator is interposed between each overlapping part, wherein the continuous folding separator includes a continuous porous polymer substrate having pores; and an organic-inorganic porous coating layer formed of a mixture of inorganic particles and a binder polymer, wherein the organic-inorganic porous coating layer is discontinuously provided at the overlapping part.

In the present disclosure, the folding separator acts to surround the unit cells. The stack-folding typed electrode assembly is received in a battery case, followed by injection of an electrolyte solution, to fabricate a battery, and there is a need to improve the wettability of the electrolyte solution for the performance and safety of the battery.

Figure 4:
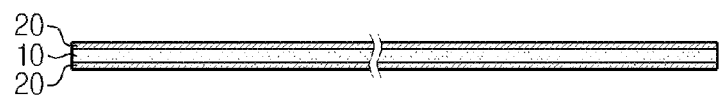
FIG. 4 is a cross-sectional view showing a folding separator of a conventional stack-folding typed electrode assembly.
Figure 5:
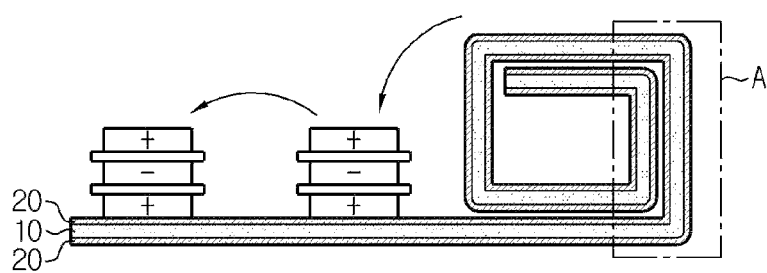
FIG. 5 is a diagram in outline showing a process of folding a conventional stack-folding electrode assembly.
Figure 6:
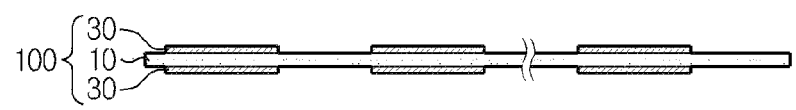
FIG. 6 is a cross-section view showing a folding separator of a stack-folding typed electrode assembly according to an embodiment of the present disclosure.
Figure 7:
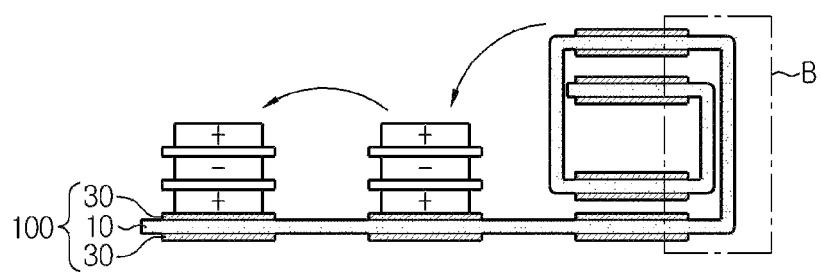
FIG. 7 is a diagram in outline showing a process of folding a stack-folding typed electrode assembly according to an embodiment of the present disclosure.
Figure 8:
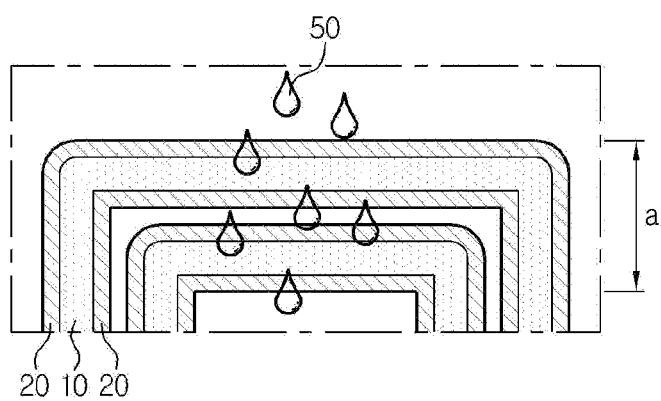
FIG. 8 is an enlarged view of section A of FIG. 5.
Figure 9:
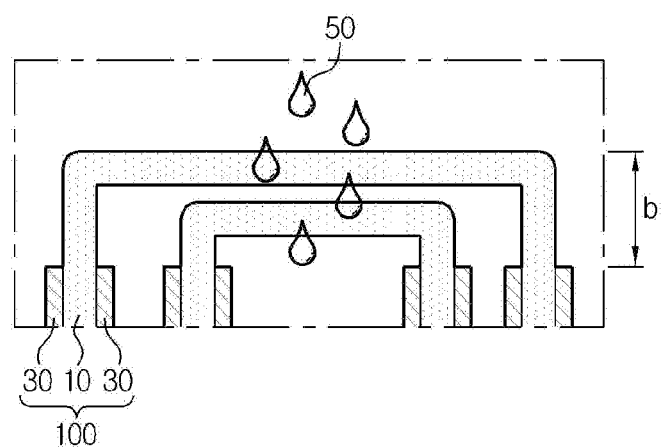
FIG. 9 is an enlarged view of section B of FIG. 7.

Hereinafter, the stack-folding typed electrode assembly of the present disclosure is described through FIGS. 4, 5 and 8 showing a conventional stack-folding typed electrode assembly, and FIGS. 6, 7 and 9 showing a stack-folding typed electrode assembly according to an embodiment of the present disclosure. The drawings show an embodiment of the electrode assembly according to the present disclosure, and the present disclosure is not limited thereto.

FIG. 4 shows the cross section of a folding separator of a conventional stack-folding typed electrode assembly, and as shown in FIG. 4, the conventional folding separator has an organic-inorganic porous coating layer 20 formed of a mixture of inorganic particles and a binder polymer on both surfaces of a porous substrate 10. As shown in FIG. 5, when a stack-folding electrode assembly is manufactured using the conventional folding separator, section A at which unit cells do not overlap has a porous substrate and the organic-inorganic porous coating layer (for simplification, unit cells are not shown at the part where the electrode assembly of FIG. 5 is folded).

The stack-folding typed electrode assembly according to the present disclosure has a folding separator wherein the organic-inorganic porous coating layer formed of a mixture of inorganic particles and a binder polymer was discontinuously provided at the areas of overlapping parts of unit cells. As shown in FIG. 6, the folding separator according to an embodiment of the present disclosure includes the continuous porous polymer substrate 10, and an organic-inorganic porous coating layer 30 formed of a mixture of inorganic particles and a binder polymer wherein the organic-inorganic porous coating layer 30 is coated discontinuously on both surfaces of the porous polymer substrate, and this discontinuous coating was performed to form the organic-inorganic porous coating layer at every location at which the unit cells are positioned. As shown in FIG. 7, when a stack-folding electrode assembly is manufactured using the folding separator according to the present disclosure, section B at which unit cells do not overlap does not have an organic-inorganic porous coating layer, and only has a porous substrate layer (for simplification, unit cells are not shown at the part where the electrode assembly of FIG. 7 is folded).

The stack-folding electrode assembly using the conventional folding separator and the stack-folding electrode assembly using the folding separator according to the present disclosure are compared through FIGS. 8 and 9. FIG. 8 is an enlarged cross-sectional view of section A of FIG. 5, FIG. 9 is an enlarged cross-sectional view of section B of FIG. 7, and in impregnation of an electrolyte solution 50, because the electrode assembly according to FIG. 9 has an area where an organic-inorganic porous coating layer is absent, it allows easier impregnation of an electrolyte solution, compared to the electrode assembly according to FIG. 8. In addition, the folding separator according to the present disclosure does not have an organic-inorganic coating layer at an area where the organic-inorganic coating layer is not necessary, thereby minimizing a thickness increase of the electrode assembly caused by the presence of the organic-inorganic coating layer. As in the comparison of FIGS. 8 and 9, it can be seen that b is shorter than a. Although this thickness reduction may differ depending on model, the thickness may reduce by approximately as much as (thickness of organic-inorganic coating layer of folding separator) *(number of unit cells+1). For example, when a stack-folding typed electrode assembly consisting of a folding separator with a porous coating layer having a thickness of 10 μm and 21 bi-cells is designed according to the present disclosure, it can have an effect on the thickness reduction by as much as 10 μm×22=220 μm in the thickness-wise direction of the electrode assembly.

That is, the folding separator according to the present disclosure is characterized by including a continuous porous polymer substrate, and an organic-inorganic porous coating layer formed of a mixture of inorganic particles and a binder polymer, wherein the organic-inorganic porous coating layer is discontinuously formed on both surfaces of the porous substrate only at locations where the unit cells overlap.

According to a preferred embodiment of the present disclosure, the organic-inorganic porous coating layer may have a width of the same size as the unit cell. Alternatively, the organic-inorganic porous coating layer may have a width that is slightly greater in size than the unit cell within the limits that conform to the object of the present disclosure in consideration of the convenience of manufacture/assembly. For example, the organic-inorganic porous coating layer may be designed to have a width that is larger than the positive electrode of the unit cell by 0.2 to 10 mm, and more preferably by 1.5 to 7.5 mm, and a width that is larger than the negative electrode by 0.1 to 9 mm, and more preferably by 1 to 6 mm. Because the positive electrode and the negative electrode may be designed in different sizes, taking this aspect into consideration, the width of the organic-inorganic porous coating layer has been described above for each of the positive electrode and the negative electrode of the unit cell.

Further, according to a preferred embodiment of the present disclosure, the thickness of the continuous porous substrate may be 1 to 100 μm.

Further, according to a preferred embodiment of the present disclosure, the thickness of the discontinuous organic-inorganic porous coating layer may be 0.01 to 20 μm.

The porous substrate may be formed of at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide and polyethylenenaphthalene, and the polyolefin may be any one polymer selected from the group consisting of polyethylene, polypropylene, polybutylene and polypentene.

According to necessary functions, the porous substrate may have a layer structure composed of the above polymers such as polypropylene/polyethylene/polypropylene.

The organic-inorganic porous coating layer has the inorganic particles adhered to each other by the binder polymer to maintain a bound state of the inorganic particles (that is, the binder polymer connects and immobilizes the inorganic particles), and the organic-inorganic porous coating layer maintains a bound state with the porous substrate by the binder polymer. The inorganic particles of the organic-inorganic porous coating layer are present in a closed packed or densely packed structure such that they are substantially in contact with each other, and interstitial volumes formed by the contact of the inorganic particles become pores of the organic-inorganic porous coating layer. The separator with the organic-inorganic porous coating layer has good heat resistance and enhanced stability, but may have an increased electrical resistance due to the binder polymer.

The inorganic particles are not particularly limited if they are only electrochemically stable. That is, the inorganic particles that can be used in the present disclosure are not particularly limited if they do not cause any oxidation and/or reduction reaction in an operating voltage range (for example, from 0 to 5V for $Li/Li^+$) of an electrochemical device to be applied. In particular, when inorganic particles capable of transporting ions are used, such inorganic particles may increase ion conductivity in an electrochemical device, contributing to the improved performance. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution. For these reasons, the inorganic particles preferably include inorganic particles having a high dielectric constant greater than or equal to 5, preferably, greater than or equal to 10, inorganic particles capable of transporting lithium ions, or mixtures thereof.

The binder polymer that can be used in the organic-inorganic porous coating layer includes, but is not limited to, for example, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and low molecular weight compounds having a molecular weight of 10,000 g/mol or less.

An amount ratio of the inorganic particles to the binder polymer in the organic-inorganic porous coating layer of the present disclosure is preferably a weight ratio of from 10:90 to 99:1.

Hereinafter, the structure of the stack-folding typed electrode assembly of the present disclosure is described in further detail.

A general unit cell has a structure in which a layered structure of a positive electrode, a negative electrode, and a separator is cut to a regular shape and size, followed by stacking. Here, for all the electrodes, an electrode having a coating of an electrode active material on a current collector is used. This structure is treated as one unit cell for constructing a battery by stacking, and to this end, the electrode and the separator need to be adhered. The separator in the unit cell is distinctively different from a folding separator for folding unit cells.

A unit cell is classified into a full cell and a bicell, and the full cell refers to a stacked structure such as positive electrode/separator/negative electrode or positive electrode/separator/negative electrode/separator/positive electrode/separator/negative electrode in which two outermost electrodes comprise both a positive electrode and a negative electrode. In contrast, the bicell refers to a stacked structure in which two outermost electrodes comprise the same electrode, and is classified into a negative electrode-type bicell composed of positive electrode/separator/negative electrode/separator/positive electrode and a positive electrode-type bicell composed of negative electrode/separator/positive electrode/separator/negative electrode.

The plurality of unit cells may be joined to one surface of the folding separator singly or in an alternating manner, or to both surfaces of the folding separator, followed by bending or winding of the folding separator, to manufacture a stack-folding separator.

The electrode according to the present disclosure is not limited to a particular type, and may be made by coating an electrode active material slurry on a current collector according to a common method known in the art. A positive electrode active material and a negative electrode active material used in the electrodes may include a common electrode active material used for a positive electrode and a negative electrode of a traditional electrochemical device. Of the electrode active material, the positive electrode active material preferably includes, as a non-limiting example, lithium manganese oxide, lithium cobalt oxide, lithium nickel oxide, lithium iron oxide, or lithium composite oxides thereof. The negative electrode active material preferably includes, as a non-limiting example, lithium metals or lithium alloys, soft carbon, hard carbon, natural graphite, Kish graphite, pyrolytic carbon, mesophase pitch based carbon fibers, meso-carbon microbeads, mesophase pitches, and petroleum or coal tar pitch derived cokes.

After the electrode active material is added to an organic solvent together with an additive such as a binder and a conductive material by a common method in the art to prepare an electrode mix slurry, the slurry may be coated on each electrode current collector, to make an electrode. A non-limiting example of a positive electrode current collector may include aluminum and nickel, and a non-limiting example of a negative electrode current collector may include copper, gold, nickel or copper alloys.

Figure 2:
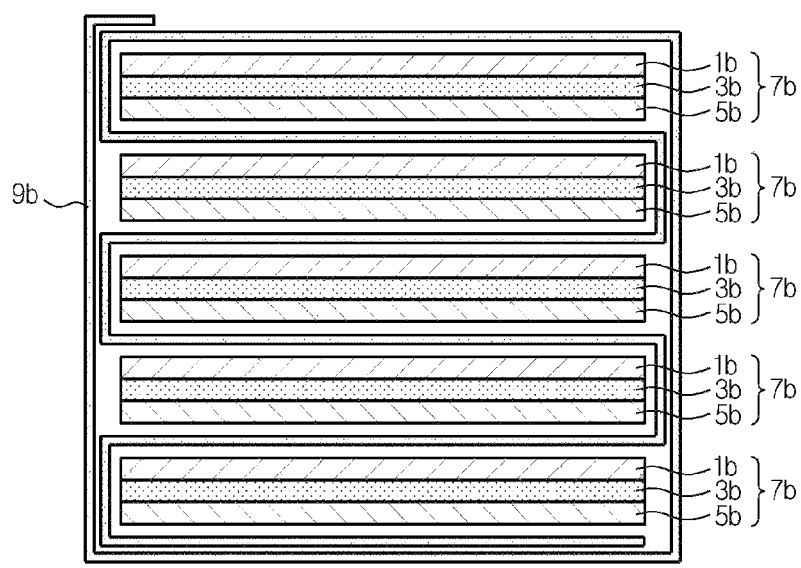
FIG. 2 is a cross-sectional view in outline showing another example of implementation of a stack-folding typed electrode assembly.
Figure 3:
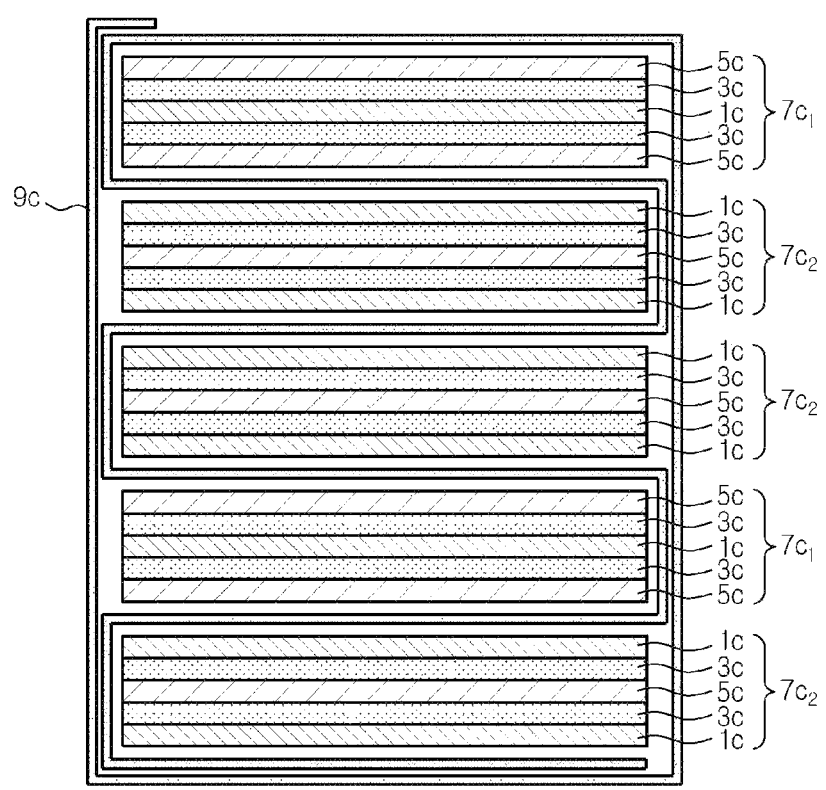
FIG. 3 is a cross-sectional view in outline showing still another example of implementation of a stack-folding typed electrode assembly.

When the unit cells are prepared as above, an electrode assembly may be manufactured using a stack-folding method as shown in FIGS. 1 through 3. Specifically, folding is performed in a direction in which the folding separator surrounds the unit cells or bicells, so that the unit cells or bicells have an arrangement structure in which they correspond to each other in a stacked shape.

Figure 10:
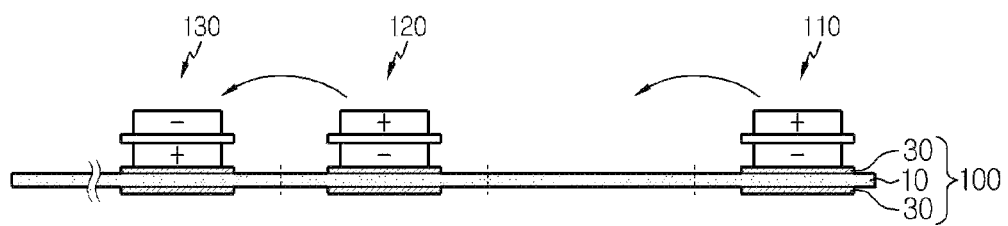
FIG. 10 is a diagram in outline showing an electrode assembly before folding of a stack-folding typed electrode assembly according to an embodiment of the present disclosure.
Figure 11:
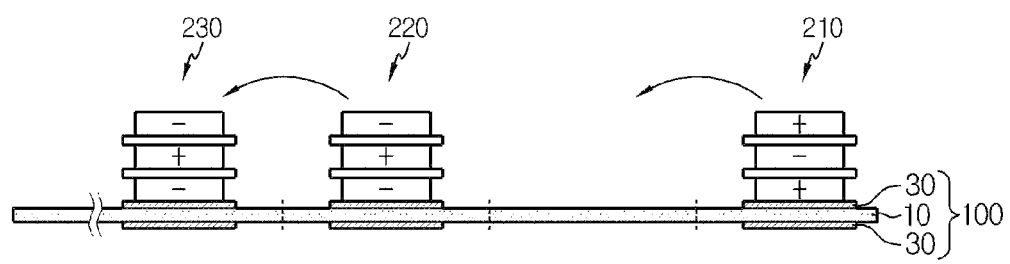
FIG. 11 is a diagram in outline showing an electrode assembly before folding a stack-folding typed electrode assembly according to another embodiment of the present disclosure.

In FIGS. 10 and 11, a fold direction for manufacturing the electrode assembly according to an embodiment of the present disclosure is indicated by an arrow, and a fold point is indicated as a dotted line. In this instance, FIG. 10 shows the case of using full cells, and FIG. 11 shows the case of using bicells.

As shown in the drawings, when folding starts from a right end, there is an area in which no unit cell or bicell is placed, approximately corresponding to a width of one unit cell, namely, a full cell 110 or a bicell 210, to allow an electrode disposed on top of the unit cell, the full cell 110 or the bicell 210, to come into contact with the folding separator. In this instance, the folding separator of the present disclosure has the organic-inorganic porous coating layer 30 formed on both surfaces of the continuous porous substrate 10 at the area where the unit cells are positioned.

Subsequently, when a folding process is continuously performed in the arrow direction from the point indicated as a dotted line, all the unit cells, the full cells 110, 120 and 130 or the bicells 210, 220 and 230, are surrounded by the folding separator 100 with the folding separator 100 interposed between the adjacent unit cells, full cells or the bicells, and have an arrangement structure in which the unit cells, the full cells or the bicells, correspond to each other in a stacked shape (stack-folding). In this instance, to perform the stack-folding process as above, the interval between the unit cells, the full cells 120 and 130 and the bicells 220 and 230, subsequent to the initial unit cell, the full cell 110 and the bicell 210, shown in FIGS. 10 and 11, correspond to the height of the cells stacked before in each unit cell, full cell or bicell, and it is obvious to those skilled in the art that the interval gradually increases, but those skilled in the art should understand that the interval is illustrated in FIGS. 10 and 11 as being uniform for convenience of representation.

In the electrolyte solution used in the present disclosure, the lithium salt that can be included as an electrolyte is not limited to a particular type if it is commonly used in an electrolyte solution for a lithium secondary battery, and an anion of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte solution used in the present disclosure, the organic solution included in the electrolyte solution is not limited to a particular type if it is commonly used in an electrolyte solution for a lithium secondary battery, and may typically include any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or mixtures thereof. Particularly, among the exemplary carbonate-based organic solvents, it is desirable to use cyclic carbonate such as ethylene carbonate and propylene carbonate which corresponds to an organic solvent with high viscosity and allows favorable dissolution of the lithium salt in the electrolyte by virtue of a high dielectric constant, and when cyclic carbonate is mixed with linear carbonate with a low viscosity and a low dielectric constant such as dimethyl carbonate and diethyl carbonate at an optimum ratio, the use of such a mixture contributes to preparation of an electrolyte solution with high electrical conductivity.

Optionally, the electrolyte solution used according to the present disclosure may further include an additive such as an overcharge protection agent being commonly included in an electrolyte solution.

The battery case used in the present disclosure may include those commonly used in the art, and there is no limitation on an external shape based on the purpose of the battery, and for example, a cylindrical shape using a can, a prismatic shape, a pouch-shape, or a coin-shape is available.

When the electrode assembly is completed, the electrode assembly may be received in the case by a common method, followed by sealing, to fabricate an electrochemical device. The electrochemical device is preferably a lithium secondary battery.

The present disclosure is not limited thereto, and it is obvious that various modifications and changes can be made by those skilled in the art within the scope of the technical aspects of the present disclosure and the appended claims and equivalents thereto.

What is claimed is:

1. A stack-folding typed electrode assembly, comprising:
an electrode assembly having a structure in which a plurality of unit cells overlaps and a continuous folding separator is interposed between each overlapping part,
wherein the continuous folding separator comprises a continuous porous polymer substrate having pores; and an organic-inorganic porous coating layer formed of a mixture of inorganic particles and a binder polymer,
wherein the organic-inorganic porous coating layer is discontinuously provided at the overlapping part, such that the organic-inorganic porous coating layer has a plurality of discontinuous portions, adjacent ones of the discontinuous portions being spaced apart from one another by gradually increasing intervals in a folding direction of the continuous folding separator.

2. The stack-folding typed electrode assembly according to claim 1, wherein each of the discontinuous portions of the organic-inorganic porous coating layer has a first width that is equal to a second width of positive and negative electrodes of each of the unit cells, the first and second widths being in the folding direction of the continuous folding separator.

3. The stack-folding typed electrode assembly according to claim 1, wherein each of the discontinuous portions of the organic-inorganic porous coating layer has a first width that is larger than a second width of a positive electrode of each of the unit cells by 0.2 to 10 mm, the first and second widths being in the folding direction of the continuous folding separator.

4. The stack-folding typed electrode assembly according to claim 1, wherein the porous substrate is formed of at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide and polyethylenenaphthalene.

5. The stack-folding typed electrode assembly according to claim 1, wherein the inorganic particles are selected from the group consisting of an inorganic particle having a dielectric constant of higher than or equal to 5, an inorganic particle having a lithium ion transfer capability, and mixtures thereof.

6. The stack-folding typed electrode assembly according to claim 1, wherein the continuous porous substrate of the folding separator has a thickness of from 1 to 100 μm.

7. The stack-folding typed electrode assembly according to claim 1, wherein the discontinuous organic-inorganic porous coating layer of the folding separator has a thickness of from 0.01 to 20 μm.

8. The stack-folding typed electrode assembly according to claim 1, wherein the folding separator has a unit length sufficient to surround the unit cells, and is folded each unit length and continuously surrounds the unit cells, starting from a center unit cell to an outermost unit cell.

9. An electrochemical device comprising the stack-folding typed electrode assembly defined in claim 1 received in a case.

10. The electrochemical device according to claim 9, wherein the electrochemical device is a lithium secondary battery.

11. The stack-folding typed electrode assembly according to claim 1, wherein each of the discontinuous portions of the organic-inorganic porous coating layer has a first width that is larger than the a second width of a negative electrode of each of the unit cells by 0.1 to 9 mm, the first and second widths being in the folding direction of the continuous folding separator.

* * * * *